(12) United States Patent
Margeta

(10) Patent No.: US 12,263,904 B1
(45) Date of Patent: Apr. 1, 2025

(54) MICROMOBILITY PARKING RACK FOR LOCKING A SCOOTER WITH U-LOCK

(71) Applicant: Damir Margeta, Sarajevo (BA)

(72) Inventor: Damir Margeta, Sarajevo (BA)

( * ) Notice: Subject to any disclaimer, the term of this patent is extended or adjusted under 35 U.S.C. 154(b) by 0 days.

(21) Appl. No.: 18/368,574

(22) Filed: Sep. 15, 2023

Related U.S. Application Data

(60) Provisional application No. 63/406,759, filed on Sep. 15, 2022.

(51) Int. Cl.
*B62H 3/02* (2006.01)

(52) U.S. Cl.
CPC ...................................... *B62H 3/02* (2013.01)

(58) Field of Classification Search
CPC .................................... B62H 3/02; B62H 3/00
USPC ...................... 211/5, 22, 17, 20, 24; D12/115
See application file for complete search history.

(56) References Cited

U.S. PATENT DOCUMENTS

| | | | | |
|---|---|---|---|---|
| 512,548 | A * | 1/1894 | Hurlbut | B62H 3/12 211/20 |
| 1,252,135 | A * | 1/1918 | Meiselbach | B62H 1/00 280/297 |
| 3,529,729 | A * | 9/1970 | Gappa | B63H 3/04 211/20 |
| 3,786,928 | A * | 1/1974 | Johnson | E05B 71/00 D12/115 |
| 3,877,622 | A * | 4/1975 | McLain | B60R 9/10 224/532 |
| 4,262,899 | A * | 4/1981 | Alvarez | A63B 21/00069 482/61 |
| 5,082,120 | A * | 1/1992 | Vega | B62H 3/12 211/20 |
| D324,009 | S * | 2/1992 | Smith | 211/20 |
| D369,131 | S * | 4/1996 | Smith | D12/115 |
| D369,332 | S * | 4/1996 | Smith | D12/115 |
| 6,053,337 | A * | 4/2000 | Venegas, Jr. | B62H 3/04 211/20 |
| D449,256 | S * | 10/2001 | Kopacz | D12/115 |
| 6,460,743 | B2 * | 10/2002 | Edgerly | B60R 9/048 224/571 |
| D488,106 | S * | 4/2004 | Birkmann | D12/115 |
| D632,616 | S * | 2/2011 | Lohr | D12/115 |
| D735,091 | S * | 7/2015 | Slaughenhoupt | D12/115 |
| 9,840,293 | B2 * | 12/2017 | Little | B62H 5/003 |
| 9,873,472 | B2 * | 1/2018 | Greenblatt | B62H 3/02 |
| 11,148,740 | B2 * | 10/2021 | Greenblatt | B62H 5/003 |
| 11,820,451 | B1 * | 11/2023 | Margeta | B62H 5/003 |
| 2003/0010729 | A1 * | 1/2003 | Lopez De Luzuriaga | B62H 3/04 211/17 |
| 2012/0043286 | A1 * | 2/2012 | Noyes | B60R 9/10 248/340 |
| 2016/0144912 | A1 * | 5/2016 | Greenblatt | F16B 5/02 211/5 |
| 2024/0067287 | A1 * | 2/2024 | Shin | B62M 6/80 |
| 2024/0140547 | A1 * | 5/2024 | Na | B62H 3/02 |

* cited by examiner

Primary Examiner — Jennifer E. Novosad

(57) ABSTRACT

Micromobility Parking Rack with Locking for Scooter with U-lock is an upright beam structure adapted to be affixed to a solid surface. It comprises of a rigid beam base structure comprising vertical posts, a crossbar and a horizontal lean bar permanently attached to the base structure, which is purposed to facilitate locking of scooters to the rack with a user-provided bicycle locks.

1 Claim, 9 Drawing Sheets

MICROMOBILITY PARKING RACK FOR LOCKING A SCOOTER WITH U-LOCK

CROSS-REFERENCE TO RELATED APPLICATION

The present application claims benefits in part to the U.S. provisional patent application Ser. No. 63/406,759 filed on Sep. 15, 2022. The entire disclosure is included herein in its entirety at least by reference.

TECHNICAL FIELD

The present disclosure relates to bicycle and scooter parking rack, street furniture design.

BACKGROUND OF THE INVENTION

With agile e-scooters growing in high numbers and being established as a fully fledged micromobility vehicle in the cities, demand for thereof proper and safe parking infrastructure is on a rise, which resulted with the invention of a several separate technical solutions of the parking racks to accommodate and enable proper and safe parking of scooters, generally with a use of the standard bicycle locks. This practice generally results in furnishing the locations in demand with two types of parking racks, one for the bicycles and the other for scooters, which is not practical and requires additional space and higher use of resources to provide parking for two types of vehicles which are very alike in transport use and purpose.

Bicycle racks known in the art, such are hoop or the inverted-U racks, with the use of standard user-provided locks, such is prevalent U-lock, are not well-adapted method for parking scooters and do not provide proper safety against theft and vandalism thereof. When secured with U-lock to the steering stem and the parking rack, due to the open contour of L-shape frame construction, and easily removed handle bars, scooters may be exposed to theft, wherein U-locks generally leave enough clearance between the parking rack construction and inside of the U-lock shackle for thiefs to pull out the scooter outside the lock, especially when handle bars are removed. Additionally, when lock in the conventional manner, scooters may easily slide off the parking rack, topple down to the ground and get damaged. This can be prevented with the introduction of the multi-functional micromobility parking rack with the additional securing elements, such is integrated horizontal lean bar with the lock slots, adjusted to be to be used with a variety of conventional user-provided locks, preferably U-locks, to enable safe and convenient parking of scooters.

OVERVIEW—BRIEF SUMMARY OF THE INVENTION

Disclosed is a bicycle and scooter parking rack with enhanced safety features to improve and enable parking of scooters in a safe, vandalism-resistant and orderly manner. In all its variants, the invention includes a rigid upright base structure, comprised of two vertical posts and a crossbar, and additional correlating securing members, more specifically, a horizontal lean bar with at least one lock wedge and lock slot.

In all present variants of the invention, the base structure is usually, but not limited to, formed from of a steel pipes of a different cross-sectional profiles in shape of a hoop or an inverted-U bicycle parking rack, or other appropriate shape which is known in the trade. Furthermore, the base structure is affixed to hard surface or ground in manner known in trade, and able to support bicycles and scooters, preferably in an upright and parallel positions, at least one on each side of the invention.

All embodiment of the invention include the horizontal lean bar with lock slots, which is of a novel design and advantageous properties. It should be noted that horizontal lean bars of a conventional design are known in trade and purposed to secure smaller and children's bicycles, or bicycles with a step-through frame, to the parking rack with use of standard bicycle locks. However, hereby presented horizontal lean bar with lock slots is different, of a specific design, geometry and fabrication, and with the additional purpose to enable afore-mentioned safe and orderly parking of scooters. Novel horizontal lean bar is geometrically vertically disposed in between and at the upper middle of the vertical posts, and permanently attached to the base structure in a manner known in the art.

Mostly, but not limited to, the horizontal lean bar with the lock slots is fabricated from one-piece sturdy flat iron bar and introduces an additional element—at least one protruding lock wedge which forms a hook-like lock slot on the lean bar. The lock slot advantageous purpose is to serve as the anchorage for the U-lock shackle, thereby enabling enhanced locking method of parked scooters to the construction of the parking rack, which is novel to the trade.

More precisely, the lock slots are of a specific geometry, preferably of a hook-like shape, and disposed in accordance with the standard sizes of the inside clearance of the U-lock shackles, which are generally between 6 and 11 inches long, and 4 to 5 inches wide, but not limited to. It should be noted that the lock slots on the horizontal lean bar may come in the different shapes and may be laid out in many setups, where lateral distance to the parking rack vertical posts is determined depending on the size of the U-locks designed to receive. Furthermore, lock slots are designed and geometrically disposed to enable parking of a scooter to the invention with the U-locks in a following manner.

Once the scooter is disposed parallel to the longer side and leaned against the base structure of the invention in an upright position, the U-lock shackle is firmly mounted into the lock slot through the open side thereof, engaged around at least one vertical post of the invention, generally one closer to the lock slot, and the steering stem of the parked scooter. Finally, U-lock shackle is closed and locked with the U-lock crossbar. Consequently, the U-lock is not possible to unmount from the lock slot, nor to pull down the U-lock shackle over the lock wedge since the clearance between the vertical post of the invention and the U-lock crossbar is purposely shorter than the inner length of the lock slot. The parked scooter is secured firmly to the parking rack, without the possibilty to be pulled out of the clearance between the base structure, horizontal lean bar and U-lock shackle. Additionally, it is resistant to vandalism such is forcible pulling or shaking by the steering stem or handle bar, since the U-lock is engaged by the middle of the steering stem in accordance to the disposition of the horizontal lean bar.

Furthermore, afore-described U-lock slot has another advantageous feature novel in the trade, which is to enable easy mounting of the U-lock from the upper or bottom side of the horizontal lean bar, depending on the orientation of the lock slot and the position of the open side. Described design introduces improved, practical, mounting or unmounting of the U-lock, thereby engaging or disengaging the parked scooter from the invention.

BRIEF DESCRIPTION OF THE DRAWINGS

The invention and thereof variations will be best understood by description and reference to the accompanying drawings illustrating one or more well-contemplated examples of thereof embodiments and, together with the description of the example embodiments, serve to explain the principles and implementations of the invention. In the Drawings.

DETAIL DESCRIPTION OF EXAMPLE EMBODIMENTS

Figure 1:
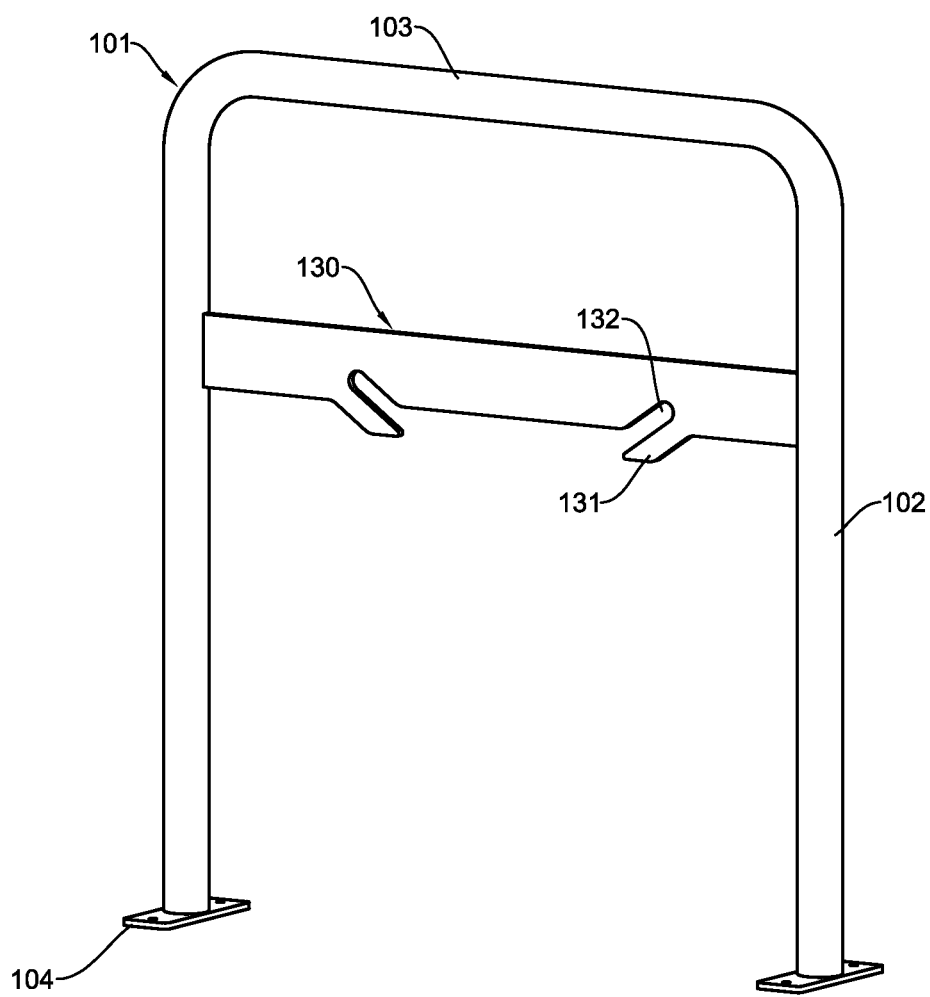
FIG. 1 is a perspective view of the present invention with the innovative horizontal lean bar with the lock slots
Figure 2:
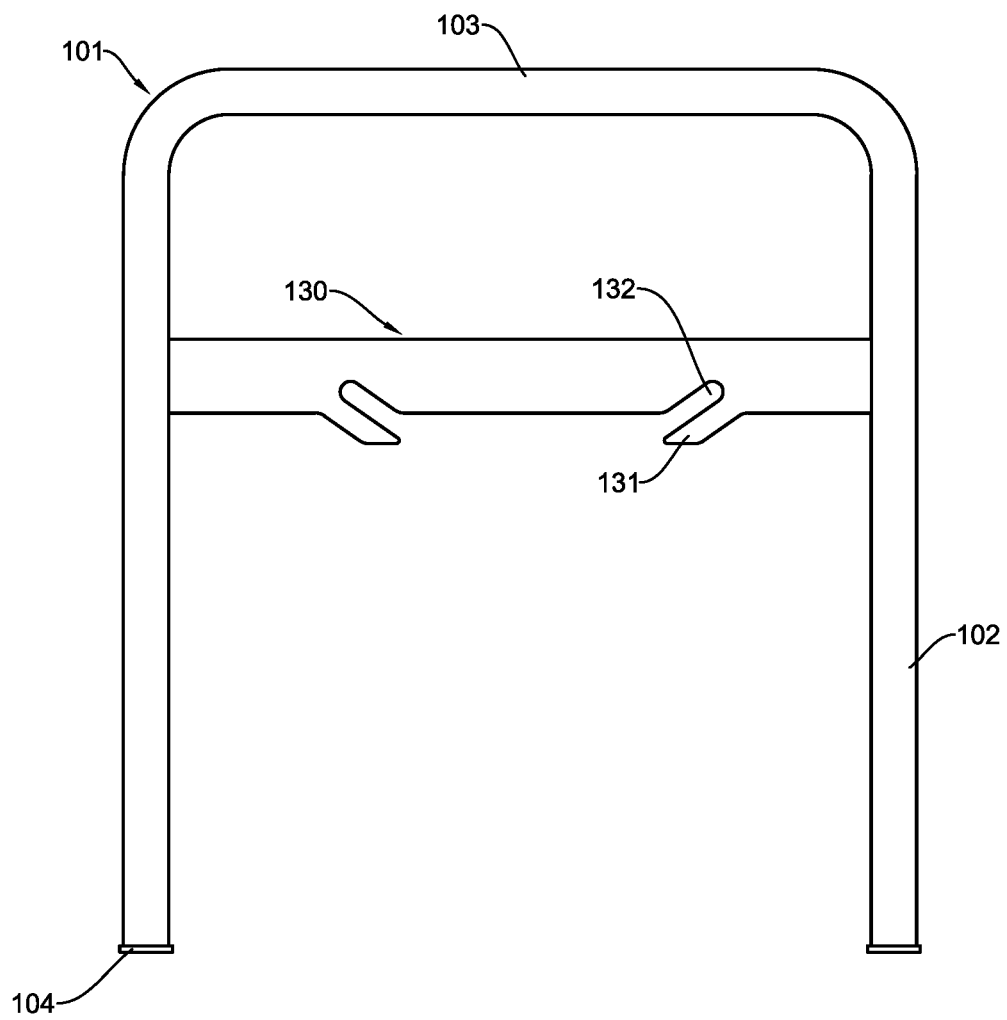
FIG. 2 is a front elevational view present invention with the innovative lean bar with the lock slots
Figure 3:
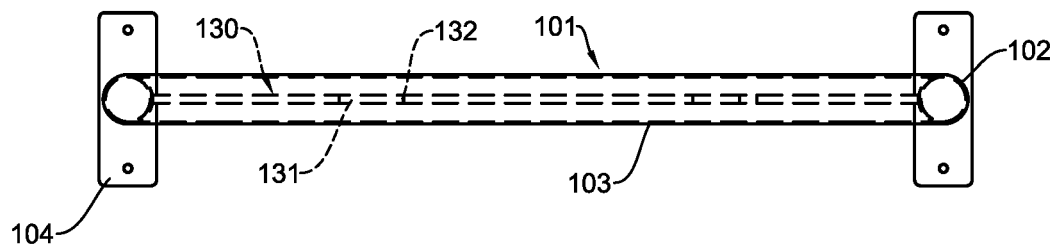
FIG. 3 is a top elevational view of the present invention, showing in dashed lines the innovative horizontal lean bar with the lock slots

Referring more particularly to the figures, wherein like numbers refer to similar parts of similar functionality that, depending on the invention embodiment, may have a different appearance, the invention 100 comprises of a rigid upright base structure 101 formed as vertical posts 102 and a crossbar 103, horizontal lean bar 130 such shown in FIG. 1-9.

Figure 4:
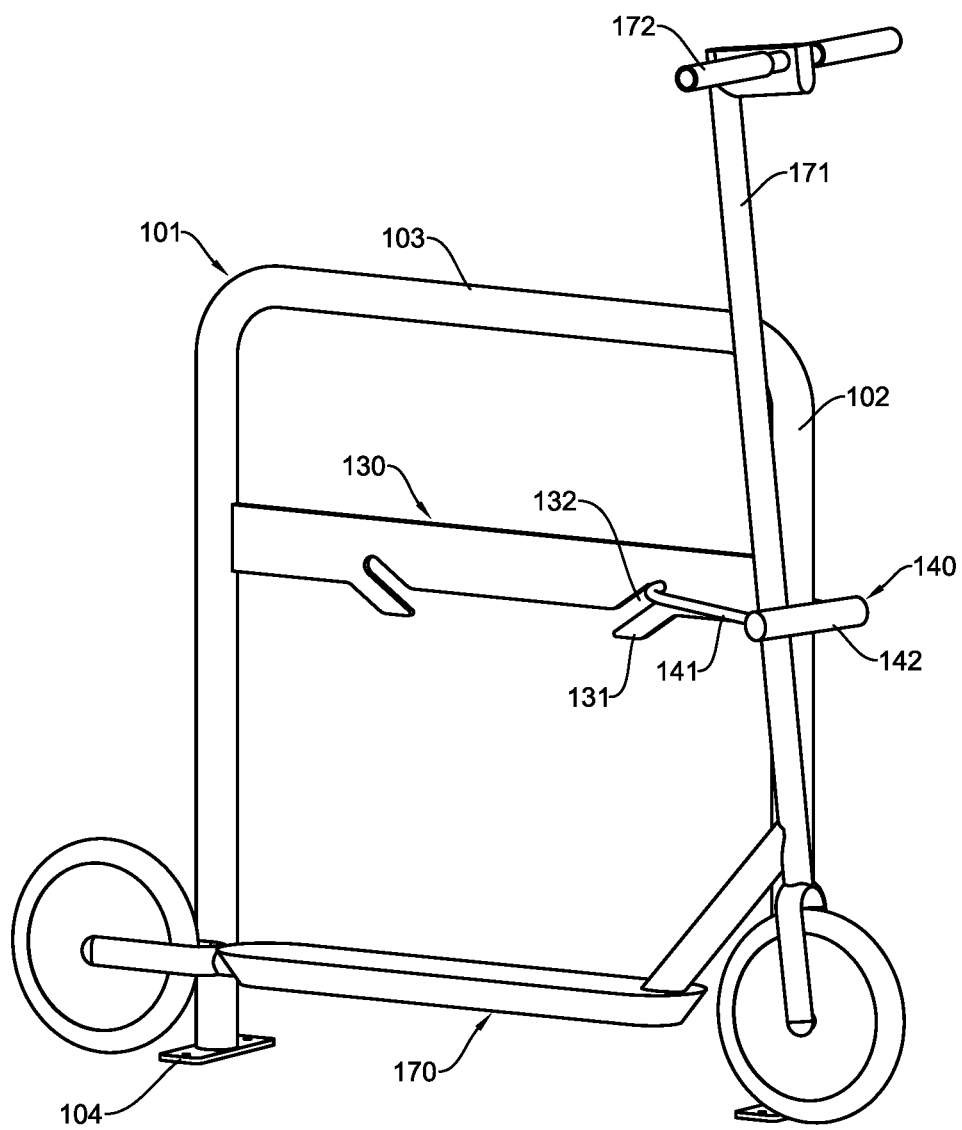
FIG. 4 is a perspective view of the present invention, illustrating the contemplated use of present invention for the parking of scooters with the U-lock
Figure 5:
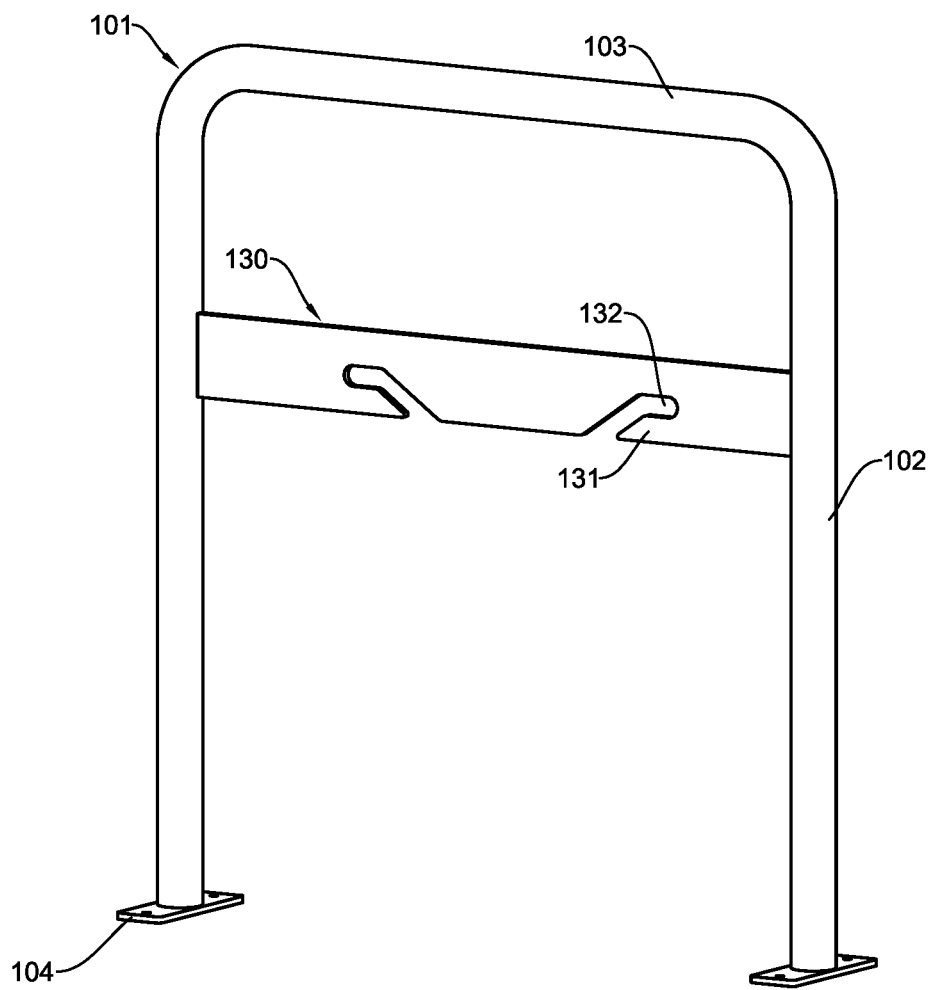
FIG. 5 is a perspective view of the present invention with the variant of the innovative lean bar with the lock slots
Figure 6:
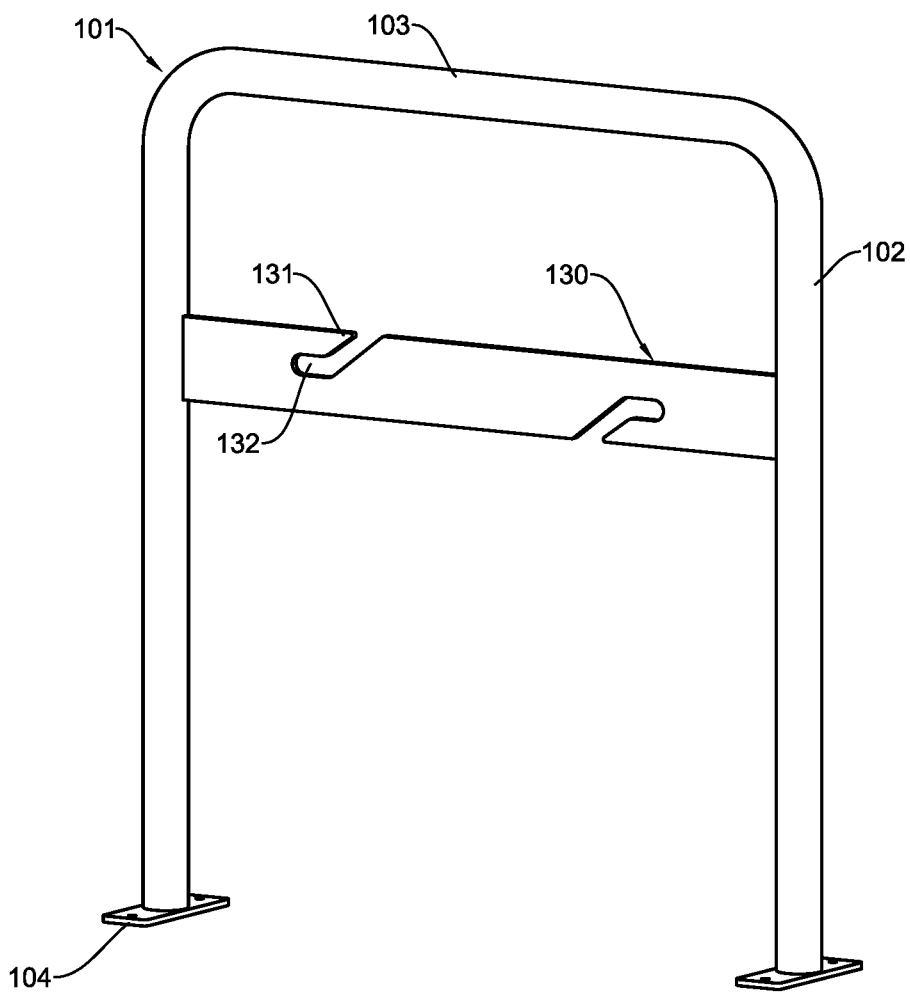
FIG. 6 is a perspective view of the present invention with the variant of the innovative lean bar with the lock slots
Figure 7:
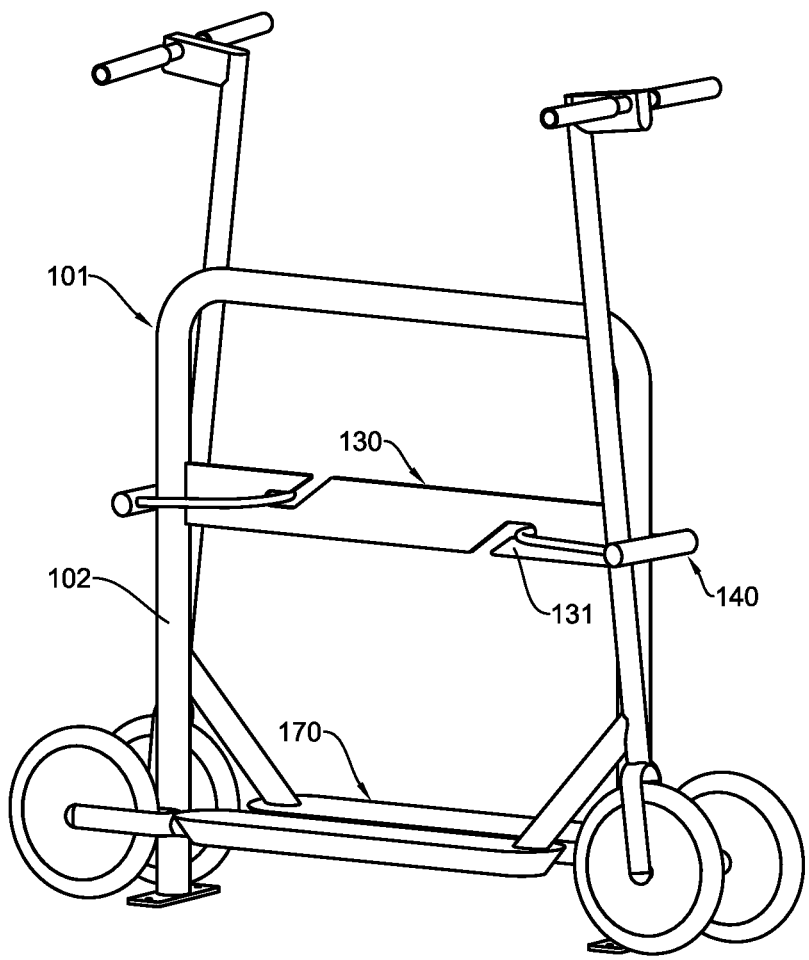
FIG. 7 is a perspective view of the present invention, illustrating the contemplated use for the parking of scooters with the U-lock
Figure 8:
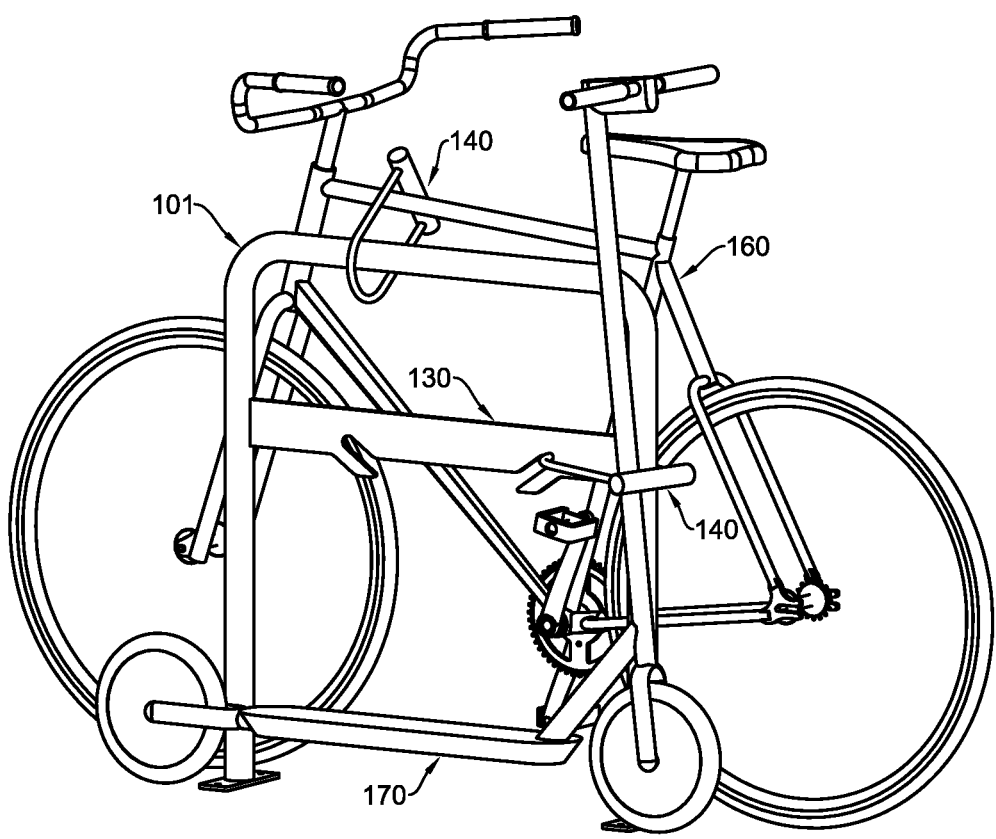
FIG. 8 is a perspective view of the present invention, illustrating the contemplated use for the parking of scooters and bicycles with the U-lock
Figure 9:
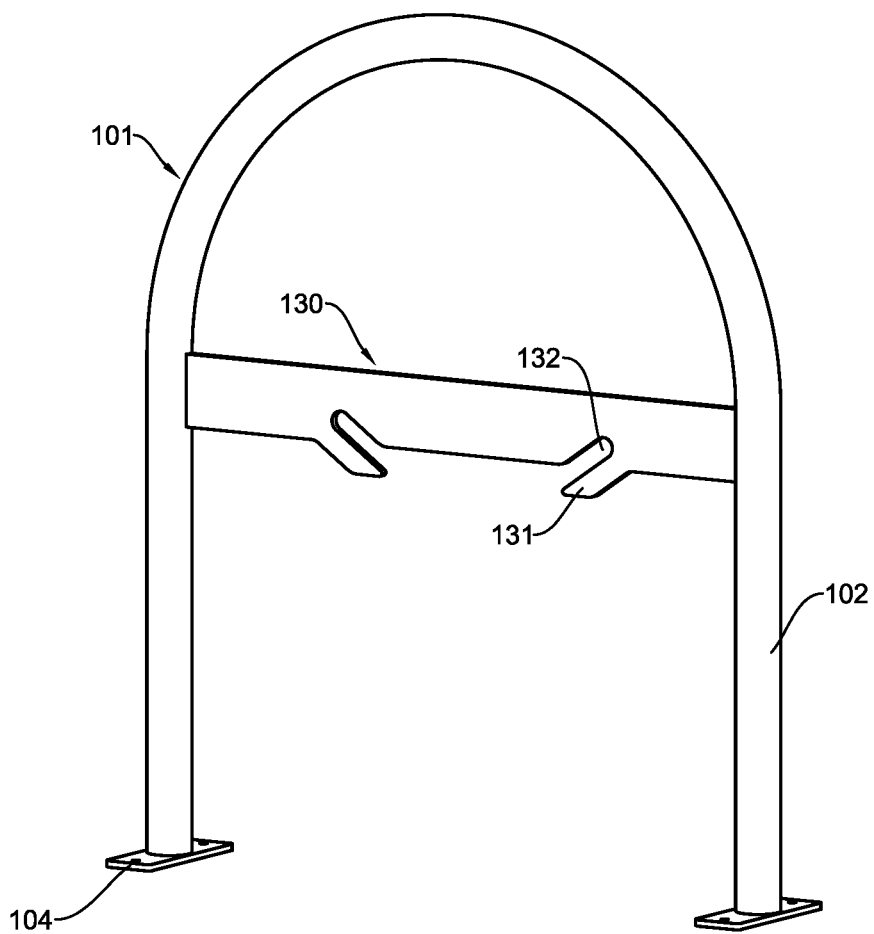
FIG. 9 is a perspective view of the variant of present invention with the innovative lean bar with the lock slots.

The base structure 101 is affixed to a solid surface or ground in a manner known in the trade, and capable of supporting and accommodating scooters 170 as shown in FIG. 4 and FIG. 7, and optionally bicycles 160 as illustrated in FIG. 8. Scooters 170 and bicycles 160 are preferably parked parallel and leaned against the base structure 101 in an vertical position, on one, or both sides of the embodiment.

The base structure 101 is fabricated of a beam, pipe or tube, depending on the embodiment, and bent in a shape of a hoop or an inverted-U bicycle rack, which are state of practice in the trade, but not limited to. The base structure 101, the crossbar 103, the vertical posts 102, horizontal lean bar 130 are, from the fabrication standpoint, made in manner known in the trade. Generally, all components of the invention 100 are made of metal, preferably steel of various quality and properties that further may be galvanized in order to provide rust-resistance of the embodiments. Also, it should be understood that the invention has been shown with the base plates 104 in all the present embodiments. However, the vertical posts 102 may be extended in case of a in-ground installation.

In the all present variants of the invention, embodiment comprises the horizontal lean bar 130 which is a member permanently attached to the base structure 101, preferably to and in between the vertical posts 102, and vertically positioned around middle thereof, but not limited to. Horizontal lean bar 130 is novel to the trade and of a different design and configuration in comparison to the conventional variants known in the art. The main advantageous modification that sets the horizontal lean bar 130 embodiments apart from the previous art is the addition of at least one lock slot 132 and lock wedge 131, which are the integral safety members of the horizontal lean bar 130. The lock slot 132 is geometrically hook-shaped member that is encompassed by a lock wedge 131, at least from a one side. The lock wedge 131 is second additional safety member of the horizontal lean bar 130 with purpose to further shape the lock slot 132 and enable the engagement of standard locks to the embodiments. The lock slots 132, which are preferably of a elongated hook shape, are purposely configured on the horizontal bar 130 and laid out in lateral position in regards to at least one, or preferably both, vertical posts 102, thereby enabling the advantageous property of the invention—securing kick or electric scooters, preferably with the use of a conventional user-provided U-lock 140 such as shown in FIG. 4.

Being purposed as the anchorage points for mounting the U-lock 140 in securing a parked scooter 170 to the invention, the lock slots 132 utilize the geometry and rigid structure of the U-locks that are produced in a range of almost standard sizes with small deviations even with similar products from different manufacturers in the trade. When mounted into the lock slot 132, the U-lock shackle 141 is enabled to encompass the vertical post 102 closer to it, from the both sides, the front, and the back, and simultaneously engage around a steering stem 171 of the scooter 170. The steering stem 171 is positioned in between the vertical post 102 and the lock slot 132 as depicted in FIG. 4. Once the U-lock shackle 141 is coupled with U-lock crossbar 142, due to the configuration of the lock slot 132, the steering stem 171 is confined within the rigidly enclosed narrow space and locked between the U-lock shackle 141, U-lock crossbar 142, and the base structure 101 of the embodiment. The lock slot 132 and the lock wedge 131 are configured in a manner that the U-lock 140 does not leave enough lateral, nor horizontal clearance for pulling out the scooter 170 between the U-lock crossbar 141 and the vertical post 102, even in the attempt of theft wherein handle bar 172 is to be removed from the steering stem 171. Thereby, the parked scooter 170 is secured well against theft. Additionally, chances of vandalism against the scooter 170, by forcible shaking or pulling the steering stem 171 or handle bar 172, are minimized as well, since the U-lock 140 engages the steering stem 171 approximately by the middle thereof, due to the favorable vertical position of the horizontal lean bar 130. Furthermore, the U-lock 140 is engaged in a manner wherein not possible to be unmounted from the lock slot 132, nor to pull down the U-lock shackle 141 over the lock wedge 131, since the clearance between the vertical post 102 of the invention and the U-lock crossbar 142 is shorter than the inner length of the lock slot 132.

What is claimed:

1. A micromobility parking rack for locking a scooter with a U-lock, whereby the scooter comprises at least a handle bar, wheels, and a steering stem, and the U-lock comprises at least a U-lock shackle and a U-lock crossbar, the parking rack consisting essentially of:

a base structure comprised of an elongated beam or pipe shaped to define a generally inverted U-shape comprised of a first substantially vertical extending post and a second substantially vertical extending post opposite the first substantially vertical extending post and a crossbar which extends between and connects to top portions of each of the substantially vertical extending posts, the base structure defining a front side and a rear side each extending along the U-shape of the beam or pipe and a left side of the base structure is defined along an outside of the first substantially vertical extending post and a right side of the base structure is defined along an outside of the second substantially vertical extending post, wherein the base structure is permanently affixed to a first and a second base plate each disposed at a bottom portion of each of the substantially vertical extending posts which are adapted to be secured to a support surface, a substantially extending horizontal lean bar permanently attached to and extending between an inside of the first and the second substantially vertical extending posts and disposed perpendicular thereto, at least one lock slot formed integrally within the substantially extending horizontal lean bar and at least one lock wedge integrally formed within the substantially extending horizontal lean bar and defined as a protruded member of the at least one lock slot and is in communication with the at least one slot, whereby the at least one lock slot and at least one lock wedge together define a safety member within the substantially extending horizontal lean bar, whereby a portion of the shape of the safety member is both non-vertically extending and non-horizontally extending, wherein when locking a scooter to the base structure with the U-lock, (i) the scooter is aligned and parked relative to one of the front side or the rear side of the base structure wherein the steering stem is generally aligned vertically and parallel to either one of the substantially vertical extending posts, (ii) the U-lock shackle is placed within the safety member which is shaped to enable a horizontal and rotational adjustment of the U-lock shackle therewithin, such that the U-lock shackle is received within the at least one lock slot and straddles the steering stem of the scooter and the at least one lock wedge prevents the U-lock shackle from being removed from the at least one lock slot after the U-lock crossbar is attached to the U-lock shackle, and (iii) the U-lock crossbar is attached to the U-lock shackle such that the U-lock crossbar is on the outside of the respective substantially vertical extending posts.

* * * * *